United States Patent
Seki et al.

(10) Patent No.: US 9,395,705 B2
(45) Date of Patent: Jul. 19, 2016

(54) LOAD TORQUE ESTIMATION APPARATUS, IMAGE FORMING APPARATUS, LOAD TORQUE ESTIMATION METHOD AND NON-TRANSITORY COMPUTER-READABLE INFORMATION RECORDING MEDIUM

(71) Applicants: Takeo Seki, Kanagawa (JP); Yoshihiro Takahashi, Kanagawa (JP)

(72) Inventors: Takeo Seki, Kanagawa (JP); Yoshihiro Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/482,056

(22) Filed: Sep. 10, 2014

(65) Prior Publication Data
US 2015/0077028 A1 Mar. 19, 2015

(30) Foreign Application Priority Data

Sep. 13, 2013 (JP) .................................. 2013-191150
Jul. 29, 2014 (JP) .................................. 2014-153607

(51) Int. Cl.
*G05B 13/02* (2006.01)
*G03G 15/16* (2006.01)
*G03G 21/16* (2006.01)

(52) U.S. Cl.
CPC ............ *G05B 13/02* (2013.01); *G03G 15/1615* (2013.01); *G03G 21/1647* (2013.01); *G03G 2221/1657* (2013.01)

(58) Field of Classification Search
CPC ....................................................... G05B 13/02
USPC ............................... 318/400.15, 400.01, 700
See application file for complete search history.

(56) References Cited

U.S. PATENT DOCUMENTS

| 6,316,895 | B1 * | 11/2001 | Ramarathnam ... H02M 7/53873 318/256 |
|---|---|---|---|
| 7,196,485 | B1 * | 3/2007 | Lee .......................... F24F 7/007 318/139 |
| 7,960,931 | B2 * | 6/2011 | Rodriguez .............. H02P 6/085 318/432 |
| 8,695,975 | B2 | 4/2014 | Seki |
| 2008/0128197 | A1 | 6/2008 | Kawaguchi et al. |
| 2013/0078021 | A1 | 3/2013 | Sakamoto et al. |
| 2013/0193894 | A1 | 8/2013 | Kiguchi et al. |
| 2013/0200836 | A1 | 8/2013 | Ishizuka et al. |
| 2013/0200838 | A1 | 8/2013 | Seki et al. |
| 2014/0049199 | A1 | 2/2014 | Ishizuka et al. |

FOREIGN PATENT DOCUMENTS

| JP | H09-308283 | 11/1997 |
|---|---|---|
| JP | 2007-097329 | 4/2007 |
| JP | 2008-137450 | 6/2008 |

* cited by examiner

*Primary Examiner* — David S Luo
(74) *Attorney, Agent, or Firm* — Harness, Dickey & Pierce, P.L.C.

(57) ABSTRACT

A load torque estimation apparatus estimates load torque of an electric motor. The apparatus includes an estimation part configured to input a controlling value for controlling the electric motor and an actually measured value of a rotational speed of the electric motor to a model and estimating load torque of the electric motor; and a derivation part configured to derive a mechanical time constant of the electric motor corresponding to the actually measured value of the rotational speed of the electric motor. The estimation part is configured to update, according to a timing of acquiring the actually measured value of the rotational speed of the electric motor, the mechanical time constant included in the model by using the mechanical time constant corresponding to the acquired actually measured value and estimate the load torque of the electric motor by using the updated model.

17 Claims, 10 Drawing Sheets

LOAD TORQUE ESTIMATION APPARATUS, IMAGE FORMING APPARATUS, LOAD TORQUE ESTIMATION METHOD AND NON-TRANSITORY COMPUTER-READABLE INFORMATION RECORDING MEDIUM

BACKGROUND OF THE INVENTION

1. Field of the Invention

The present invention relates to a load torque estimation apparatus, an image forming apparatus, a load torque estimation method and a non-transitory computer-readable information recording medium.

2. Description of the Related Art

In the related art, a technology is known to estimate the load torque of an electric motor in a real-time manner. For example, Japanese Laid-Open Patent Application No. 2008-137450 (Patent Reference No. 1) discloses a technology of determining a control model for an electric motor that is a control target and estimating the load torque of the electric motor by using a voltage value (controlling value) for controlling the electric motor and the rotational speed (actually measured value) of the electric motor.

SUMMARY OF THE INVENTION

According to one aspect of the present invention, a load torque estimation apparatus for estimating load torque of an electric motor includes an estimation part configured to input a controlling value for controlling the electric motor and an actually measured value of a rotational speed of the electric motor to a model to estimate load torque of the electric motor; and a derivation part configured to derive a mechanical time constant of the electric motor corresponding to the actually measured value of the rotational speed of the electric motor. The estimation part is configured to update, according to a timing of acquiring the actually measured value of the rotational speed of the electric motor, the mechanical time constant included in the model by using the mechanical time constant corresponding to the acquired actually measured value and estimate the load torque of the electric motor by using the updated model.

Other objects, features and advantages of the present invention will become more apparent from the following detailed description when read in conjunction with the accompanying drawings.

DETAILED DESCRIPTION OF THE EMBODIMENTS

Figure 1:
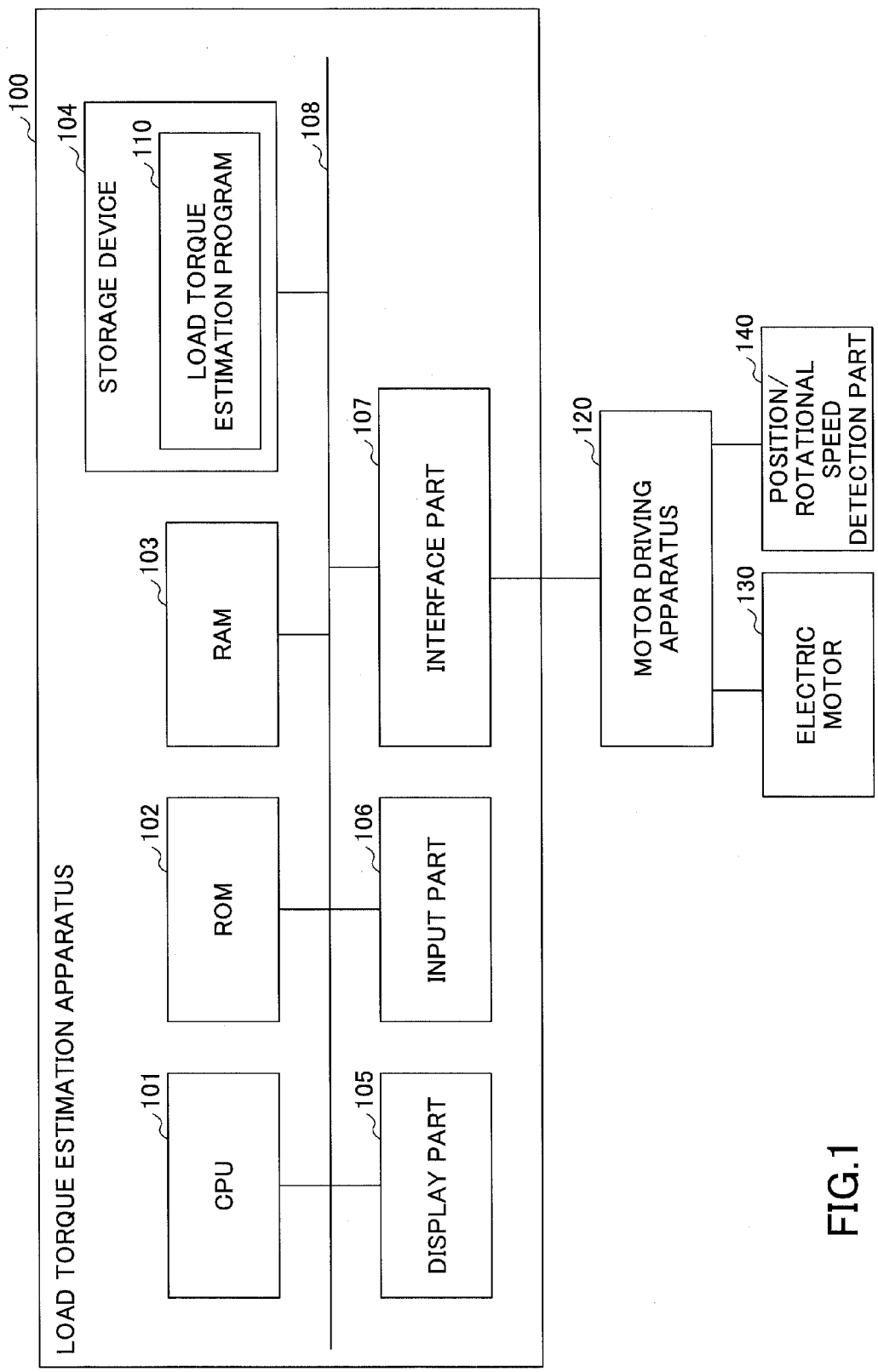
FIG. 1 illustrates a hardware configuration of a load torque estimation apparatus according to an embodiment.

In a case of determining a control model to estimate the load torque as disclosed in Patent Reference No. 1, it may be impossible to estimate the correct load torque when the state of the control target changes. This is because the determined control model may vary according to a change in the state of the control target.

Specifically, in the technology of Patent Reference No. 1, an estimation error may increase depending on the rotational speed of an electric motor. Therefore, it may be difficult to apply the technology of Patent Reference No. 1 to an apparatus having a wider control range of a rotational speed (in other words, such an apparatus as to be used at various rotation speeds from a low speed to a high speed) or so.

The embodiments of the present invention have been devised in consideration of the problem and an object of the embodiments is to improve accuracy in an estimation of the load torque of an electric motor.

Below, using the accompanying drawings, the embodiments of the present invention will be described. Note that as for parts/elements having substantially identical functional configurations, the same reference numerals are provided and duplicate description are omitted.

First Embodiment

Load Torque Estimation Apparatus

First, a hardware configuration of a load torque estimation apparatus according to the present embodiment will be described. FIG. 1 illustrates a hardware configuration of a load torque estimation apparatus according to the present embodiment.

As illustrated in FIG. 1, the load torque estimation apparatus 100 includes a Central Processing Unit (CPU) 101, a Read-Only Memory (ROM) 102, a Random Access Memory (RAM) 103 and a storage device 104. The load torque estimation apparatus 100 further includes a display part 105, an input part 106 and an interface part 107. The respective devices/parts in the load torque estimation apparatus 100 are mutually connected by a bus 108.

The CPU 101 executes a load torque estimation program 110 stored in the storage device 104.

The ROM 102 is a nonvolatile memory. The ROM 102 stores various programs and data necessary for the CPU 101 to execute the load torque estimation program 110. Specifically, the ROM 102 stores boot programs such as a Basic Input/Output System (BIOS), an Extensible Firmware Interface (EFI) and so forth.

The RAM 103 is a main storage device such as a Dynamic Random Access Memory (DRAM), a Static Random Access Memory (SRAM) or so. The RAM 103 functions as a work area to which the load torque estimation program 110 is expanded when it is executed by the CPU 101.

The storage device 104 stores the load torque estimation program 110. The display part 105 displays a screen page for a user to input a control target value(s) (a target rotational speed and/or a target position), a screen page for showing a detection result (actually measured value) of the rotational speed of the electric motor 130 and/or a detection result (actually measured value) of position information of the electric motor 130. Further, the display part 105 displays a screen page for showing an estimated (calculated) value of load torque.

The input part 106 is an operating device for a user to perform various input operations (operations of inputting a control target value and so forth) to the load torque estimation apparatus 100 and includes, for example, a mouse, a keyboard, and/or the like.

The interface part 107 transmits a controlling value for controlling the electric motor 130 that is a control target to a motor driving apparatus 120. Also, the interface part 107 receives, from a position/rotational speed detection part 140 via the motor driving apparatus 120, information (the actually measured value of the rotational speed or the actually measured value of the position information) that indicates a state of the electric motor 130 that is the control target.

The motor driving apparatus 120 drives the electric motor 130 based on the controlling value transmitted from the interface part 107. Also, the motor driving apparatus 120 receives the detection signal that is output by the position/rotational speed detection part 140 and transmits it as the actually measured value of the rotational speed or the actually measured value of the position information to the interface part 107.

The position/rotational speed detection part 140 is provided to the electric motor 130 and outputs the detection signal (a signal indicating the rotational speed or a signal indicating a position). In the present embodiment, the position/rotational speed detection part 140 can be, for example, a two-phase encoder or a single-phase photodetector. Also, the position/rotational speed detection part 140 can be a magnetic sensor such as a Frequency Generator (FG) sensor, a Hall element sensor or so.

<Functional Configuration of Load Torque Estimation Program>

Figure 2:
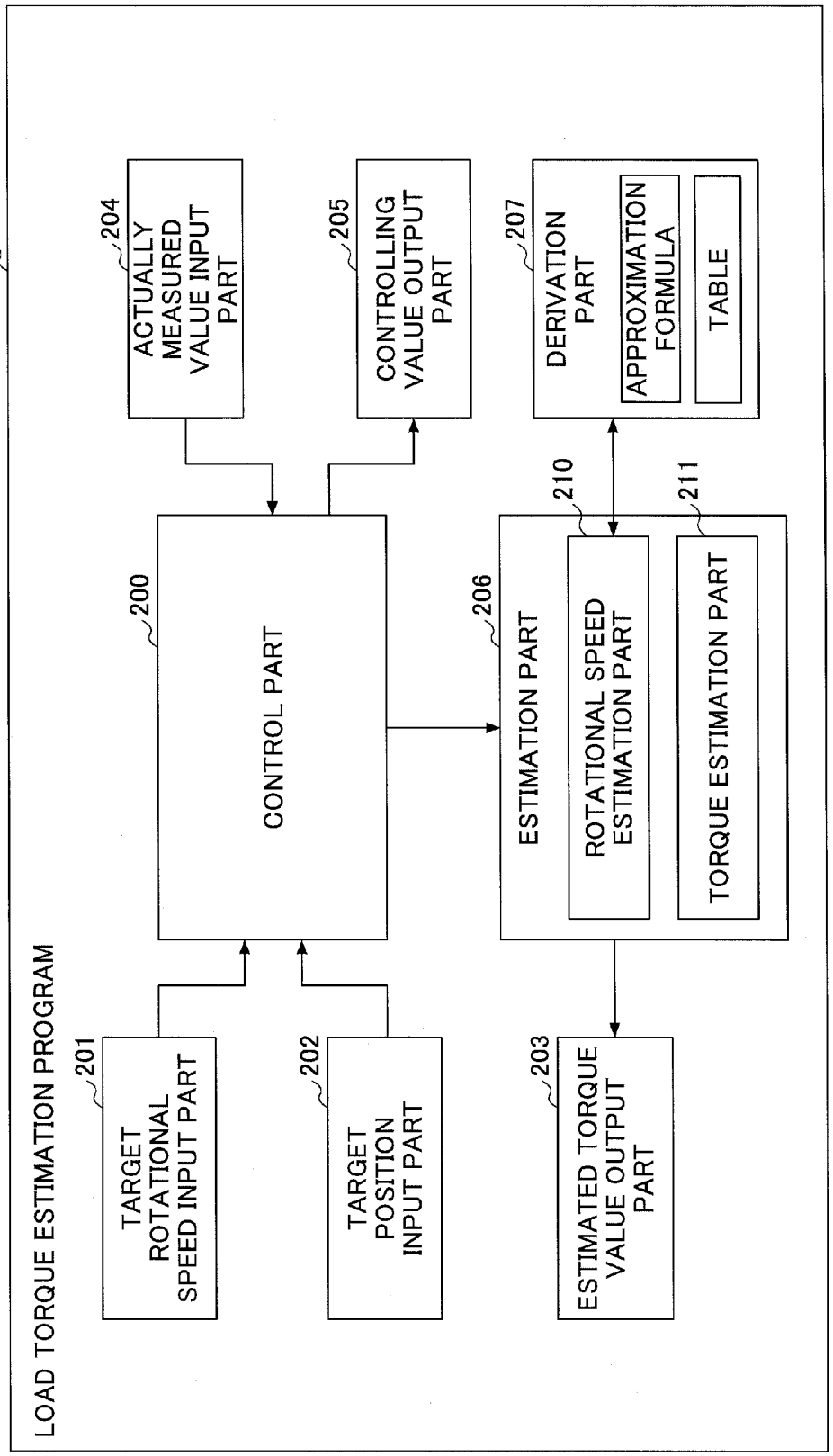
FIG. 2 is a functional configuration diagram illustrating functions implemented as a result of a load torque estimation program being executed.

Next, functions implemented from execution of the load torque estimation program 110 will be described. FIG. 2 is a functional configuration diagram illustrating functions implemented as a result of the load torque estimation program 110 being executed.

In FIG. 2, a target rotational speed input part 201 or a target position input part 202 acquires a control target value (a target rotational speed or a target position of the electric motor 130) that is input by the user using the input part 106 and inputs the control target value to a control part 200.

An actually measured value input part 204 acquires the actually measured value of the rotational speed or the actually measured value of the position information of the electric motor 130, received via the interface part 107, and inputs the acquired value to the control part 200.

The control part 200 calculates a controlling value (voltage value) for controlling the electric motor 130 based on the control target value (the target rotational speed or the target position) that is thus input and the actually measured value of the rotational speed or the actually measured value of the position information that is thus input also.

A controlling value output part 205 transmits the controlling value (voltage value) thus calculated by the control part 200 to the motor driving apparatus 120 via the interface part 107.

An estimation part 206 has a rotational speed estimation part 210 and a torque estimation part 211. The rotational speed estimation part 210 generates a motor nominal model that is a control model calculating an estimated value of the rotational speed of the electric motor 130 based on the controlling value (voltage value) that is output by the control part 200. Also, the estimation part 206 calculates an estimated value of the rotational speed using the motor nominal model.

The torque estimation part 211 generates a torque estimation model that is a control model calculating an estimated value of the load torque of the electric motor 130 based on the estimated value of the rotational speed calculated based on the motor nominal model and the actually measured value of the rotational speed acquired via the control part 200. Also, the torque estimation part 211 calculates an estimated value of the load torque of the electric motor 130 using the torque estimation model.

A derivation part 207 derives a mechanical time constant and an electrical time constant depending on the rotational speed, using an approximation formula or a table that is previously prepared, based on the actually measured value of the rotational speed transmitted from the estimation part 206. Also, the derivation part 207 inputs the thus derived mechanical time constant and electrical time constant to the estimation part 206. Note that the approximation formula or the table prescribes relationships of the rotational speed with the mechanical time constant and the electrical time constant.

The rotational speed estimation part 210 and the torque estimation part 211 in the estimation part 206 update the motor nominal model and the torque estimation model, respectively, based on the mechanical time constant and the electrical time constant that are input from the derivation part 207. Note that details of the estimation part 206 will be described later.

An estimated torque output part 203 outputs an estimated value of the load torque calculated by the torque estimation part 211 of the estimation part 206. Note that a destination to which the estimated value is output can be the storage device 104 or the display part 105. Alternatively, the estimated value can be output to an external apparatus via the interface part 107.

<Description of Block Diagram>

Figure 3:
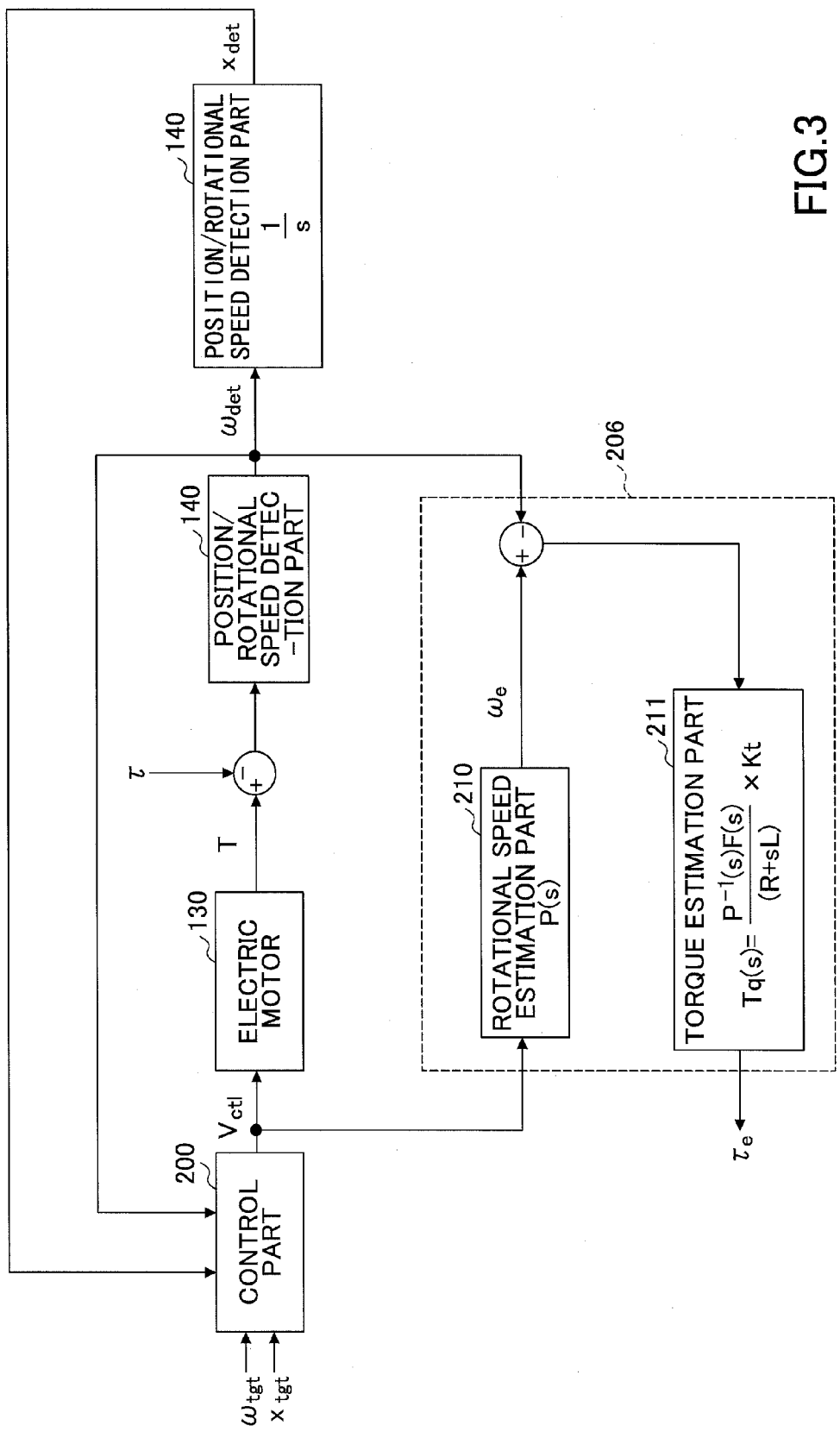
FIG. 3 is a block diagram for controlling an electric motor and estimating the load torque.

Next, a block diagram will be described for controlling the rotational speed or the position of an electric motor and estimating the load torque of the electric motor. FIG. 3 is a block diagram for controlling the rotational speed or the position of the electric motor 130 and estimating the load torque of the electric motor 130.

As shown in FIG. 3, the control part 200 outputs the controlling value (voltage value $V_{ctl}$) based on the control target value (the target rotational speed $\omega_{tgt}$ or the target position $x_{tgt}$) and the actually measured value (the actually measured value $\omega_{det}$ of the rotational speed or the actually measured value $x_{det}$ of the rotational position) that is fed back.

The electric motor 130 generates a predetermined rotational torque T based on the controlling value (voltage value $V_{ctl}$) that is output by the control part 200. In contrast thereto, the electric motor 130 receives the load torque $\tau$ and therefore, the electric motor 130 rotates at a rotational speed according to the difference between the rotational torque T and the load torque $\tau$.

The position/rotational speed detection part 140 detects the rotational speed of the electric motor 130 and feeds the rotational speed back as the actually measured value $\omega_{det}$ of the rotational speed to the control part 200.

Alternatively, the position/rotational speed detection part 140 calculates position information based on the detected rotational speed (or directly detects the position information) and feeds the position information back as the actually measured value $x_{det}$ of the position information to the control part 200.

Thus, by carrying out feedback control based on the actually measured value $\omega_{det}$ of the rotational speed or the actually measured value $x_{det}$ of the position information, the electric motor 130 is controlled to the target rotational speed $\omega_{tgt}$ or the target position $x_{tgt}$.

In parallel with the control of the rotational speed or the control of the position of the electric motor 130, the estimation part 206 successively calculates an estimated value $\tau_e$ of the load torque.

Specifically, the rotational speed estimation part 210 acquires the controlling value (voltage value $V_{ctl}$) that is output by the control part 200 and calculates an estimated value $\omega_e$ of the rotational speed of the electric motor 130 based on the motor nominal model P(s).

Further, the estimation part 206 acquires the actually measured value $\omega_{det}$ of the rotational speed detected by the position/rotational speed detection part 140, calculates the difference between the estimated value $\omega_e$ and the actually measured value $\omega_{det}$ of the rotational speed and inputs the calculated difference value to the torque estimation part 211.

The torque estimation part 211 calculates an estimated value $\tau_e$ of the load torque from the input difference value using the torque estimation model Tq(s).

The torque estimation model Tq(s) can be expressed as follows:

$$Tq(s) = \frac{P^{-1}(s)F(s)}{R+sL} \times Kt \quad \text{(FORMULA 1)}$$

$P^{-1}(s)$ denotes the reciprocal of the motor nominal model P(s). F(s) denotes a transfer function of a low-pass filter and can be expressed as follows when P(s) is an Nth-order transfer function:

$$F(s) = \frac{1}{\left(\frac{s}{f \times 2\pi + 1}\right)^n} \quad \text{(FORMULA 2)}$$

R denotes the coil resistance of the electric motor 130; L denotes the coil inductance of the electric motor 130; and Kt denotes the torque constant. f denotes a band frequency.

A procedure of calculating an estimated value $\tau_e$ of the load torque by inputting the difference value between the estimated value $\omega_e$ and the actually measured value $\omega_{det}$ of the rotational speed to the torque estimation part 211 will now be briefly described.

In the above-mentioned FORMULA 1, first the difference value between the estimated value $\omega_e$ and the actually measured value $\omega_{det}$ of the rotational speed is multiplied by $P^{-1}(s)F(s)$ and thus, an estimated value (here, referred to as $V_e$) of the voltage required for driving the electric motor 130 for the load torque $\tau$ is calculated.

Further, by multiplying the thus calculated estimated value $V_e$ of the voltage by $1/(R+sL)$, an estimated value (here, referred to as $I_e$) of the current required for driving the electric motor 130 for the load torque $\tau$ is calculated. By multiplying the thus calculated estimated value $I_e$ of the current by the torque constant Kt, it is possible to calculate an estimated value $\tau_e$ corresponding to the load torque $\tau$.

Thus, it can be seen that by multiplying the difference value between the estimated value $\omega_e$ and the actually measured value $\omega_{det}$ of the rotational speed by the torque estimation model Tq(s) shown in FORMULA 1, the estimated value $\tau_e$ of the load torque is calculated.

Note that the controlling value (voltage value $V_{ctl}$) and the actually measured value (the actually measured value $\omega_{det}$ of the rotational speed) are output every control period of the control part 200. Therefore, in the estimation part 206, it is possible to calculate the estimated value $\tau_e$ of the load torque every control period of the control part 200.

<Motor Nominal Model>

Next, details of the motor nominal model P(s) will be described. Generally speaking, an electric motor can be expressed by a block diagram shown in FIG. 4A.

Figure 4A:
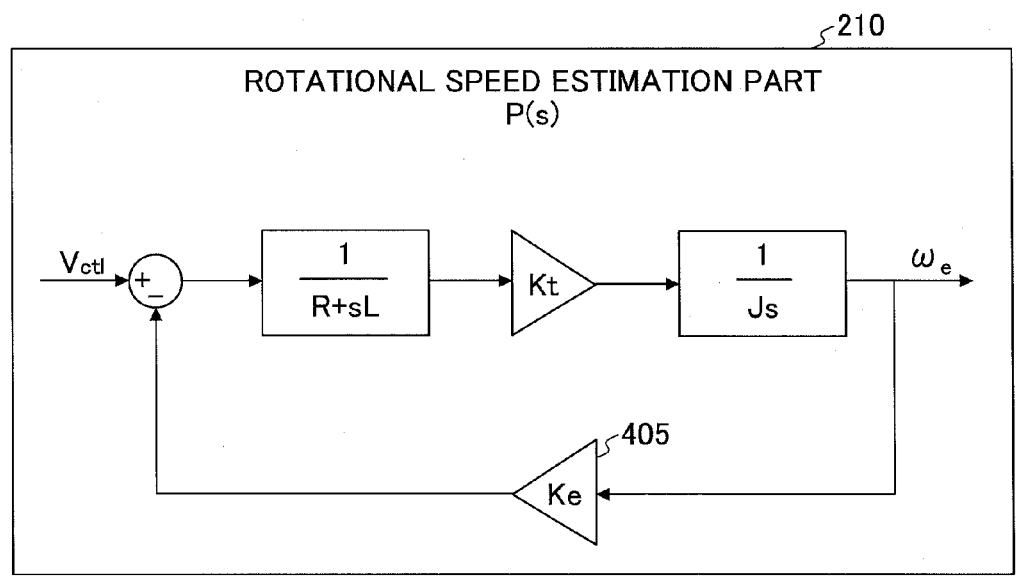
FIGS. 4A and 4B illustrate motor nominal models.

In FIG. 4A, $V_{ctl}$ denotes the controlling value (voltage value) that is output by the control part 200; R denotes the coil resistance of the electric motor 130; L denotes the coil inductance of the electric motor 130; and Kt denotes the torque constant. J denotes the inertia and Ke denotes the back electromotive force constant.

Figure 4B:
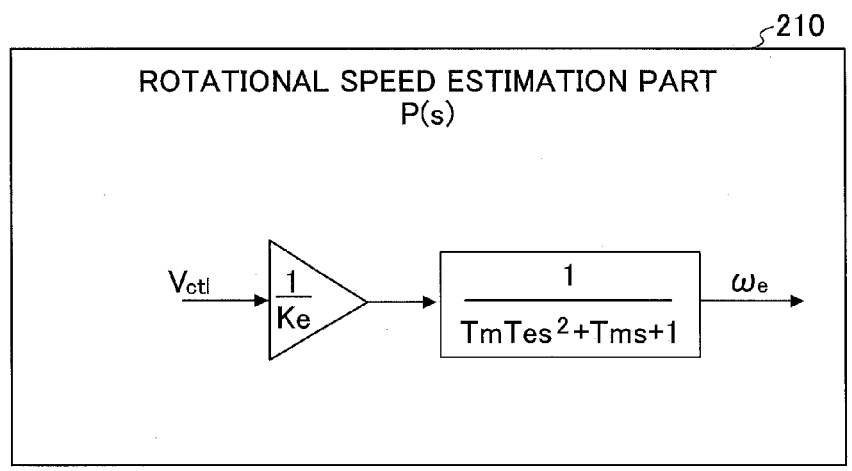

Note that the "closed loop" block diagram shown in FIG. 4A can be rewritten into the "open loop" block diagram shown in FIG. 4B.

That is, the motor nominal model P(s) can be expressed as follows:

$$P(s) = \frac{\varpi_e}{V_{ctl}} = \frac{1}{Ke} \times \frac{1}{(TmTes^2 + Tms + 1)} \quad \text{(FORMULA 3)}$$

Tm denotes a mechanical time constant, and can be expressed by the following formula:

$$Tm = \frac{JR}{KtKe} \quad \text{(FORMULA 4)}$$

J denotes the inertia, Kt denotes the torque constant and Ke denotes the back electromotive force constant.

Te denotes an electrical time constant, and can be expressed by the following formula:

$$Te = \frac{L}{R} \quad \text{(FORMULA 5)}$$

L denotes the coil inductance of the electric motor 130 and R denotes the coil resistance of the electric motor 130.

Thus, the motor nominal model P(s) required for acquiring an estimated value $\tau_e$ of the load torque includes the mechanical time constant and the electrical time constant.

The applicant of the present patent application focused attention to relationships of the rotational speed with the mechanical time constant and the electrical time constant of an electric motor when analyzing the cause of a fact that an estimated value of load torque calculated according to the related art has a greater error due to the rotational speed of the electric motor.

This is because, when calculating an estimated value of load torque according to the related art, the mechanical time constant and the electrical time constant of an electric motor are assumed as being fixed and predetermined constants are substituted for the mechanical time constant and the electrical time constant of the electric motor regardless of the rotational speed.

In contrast thereto, the applicant acquired the mechanical time constant and the electrical time constant of an electric motor for various rotational speeds experimentally. As a result, it was found out that the mechanical time constant and the electrical time constant of an electric motor vary according to the rotational speed.

Below, relationships of the mechanical time constant and the electrical time constant of an electric motor with the rotational speed will be described and a process of calculating an estimated value of load torque while updating the mechanical time constant and the electrical time constant of the electric motor according to the rotational speed will be described.

<Relationships of Mechanical Time Constant and Electrical Time Constant of Electric Motor with Rotational Speed>

First, relationships of the mechanical time constant Tm and the electrical time constant Te of the electric motor 130 with the rotational speed $\omega_{det}$ will be described using FIGS. 5-7.

Figure 5:
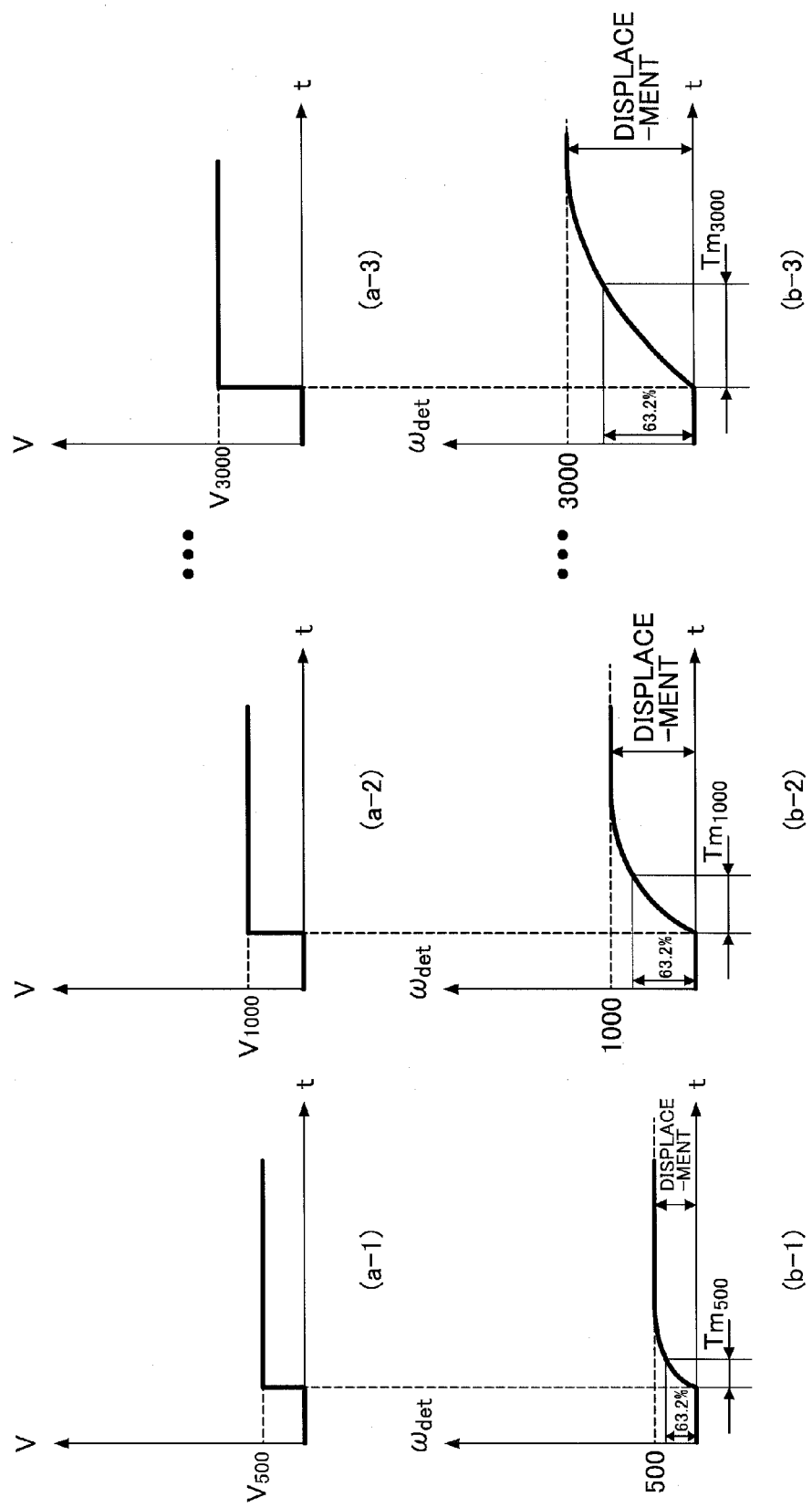
FIG. 5 illustrates a method of measuring a mechanical time constant of an electric motor.

FIG. 5 illustrates how to experimentally acquire the relationships between the mechanical time constant Tm and the rotational speed $\omega_{det}$ of the electric motor 130. In FIG. 5, a graph (a-1) illustrates a step input of a voltage $V_{500}$ such that the rotational speed becomes 500 rpm. A graph (b-1) illustrates a temporal change of the actually measured value $\omega_{det}$ of the rotational speed of the electric motor 130 when the step input of the voltage $V_{500}$ is given to the electric motor 130.

As can be seen from the graph (b-1), it is possible to derive the mechanical time constant $Tm_{500}$ at a time of 500 rpm in the rotational speed by acquiring a time required for the actually measured value $\omega_{det}$ of the rotational speed to reach 63.2% of the displacement.

Similarly, a graph (a-2) illustrates a step input of a voltage $V_{1000}$ such that the rotational speed becomes 1000 rpm. A graph (b-2) illustrates a temporal change of the actually measured value $\omega_{det}$ of the rotational speed of the electric motor 130 when the step input of the voltage $V_{1000}$ is given to the electric motor 130.

As can be seen from the graph (b-2), it is possible to derive the mechanical time constant $Tm_{1000}$ at a time of 1000 rpm in the rotational speed by acquiring a time required for the actually measured value $\omega_{det}$ of the rotational speed to reach 63.2% of the displacement.

Similarly, a graph (a-3) illustrates a step input of a voltage $V_{3000}$ such that the rotational speed becomes 3000 rpm. A graph (b-3) illustrates a temporal change of the actually measured value $\omega_{det}$ of the rotational speed of the electric motor 130 when the step input of the voltage $V_{3000}$ is given to the electric motor 130.

As can be seen from the graph (b-3), it is possible to derive the mechanical time constant $Tm_{3000}$ at a time of 3000 rpm in the rotational speed by acquiring a time required for the actually measured value $\omega_{det}$ of the rotational speed to reach 63.2% of the displacement.

Figure 7:
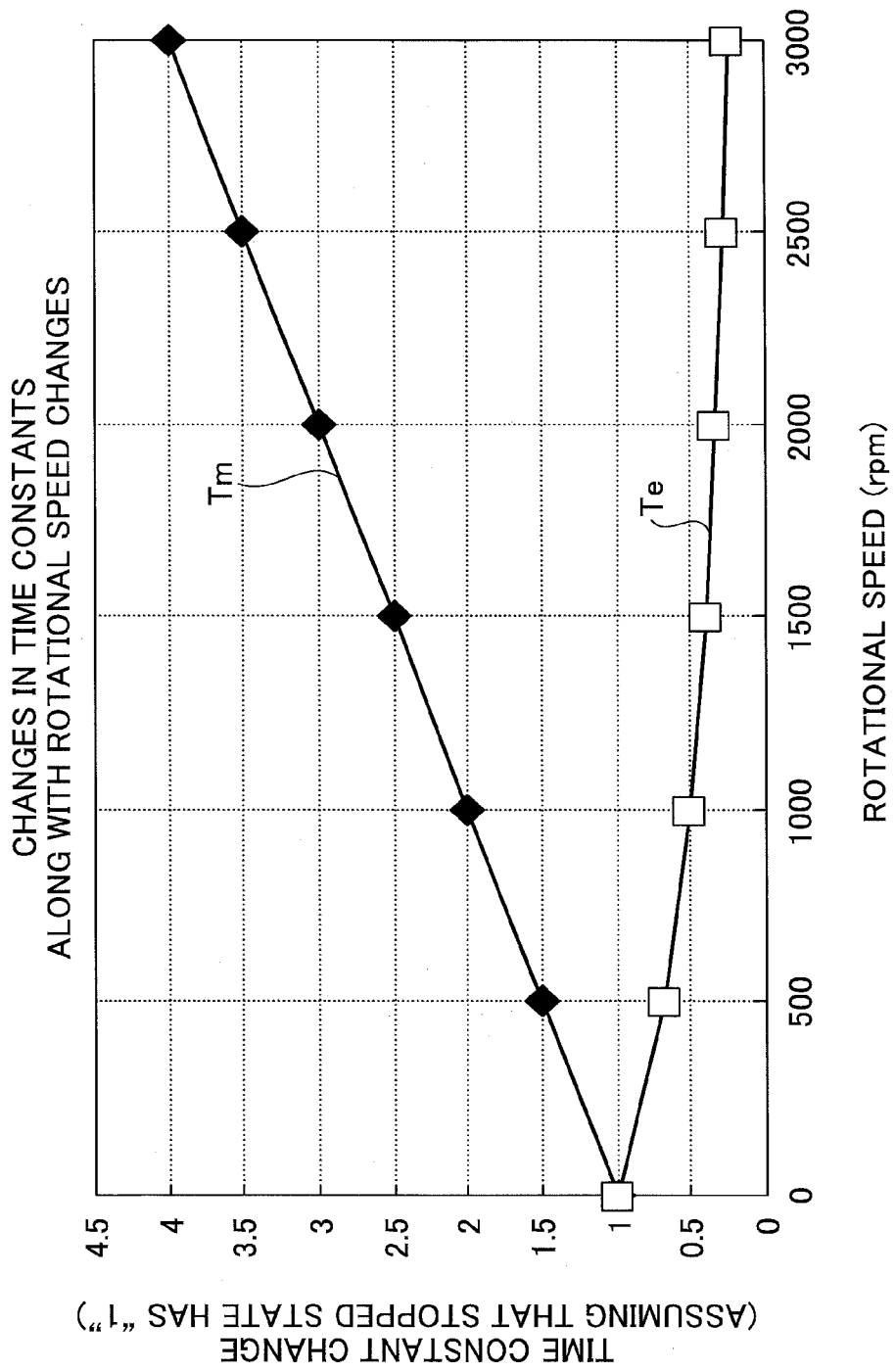
FIG. 7 illustrates relationships of the rotational speed with the mechanical time constant and the electrical time constant of an electric motor.

The graph of Tm in FIG. 7 is the thus acquired mechanical time constants at respective rotational speeds. In FIG. 7, the abscissa axis denotes the rotational speed of the electric motor 130 and the ordinate axis denotes the values acquired from standardizing the respective values of the mechanical time constant.

Figure 6:
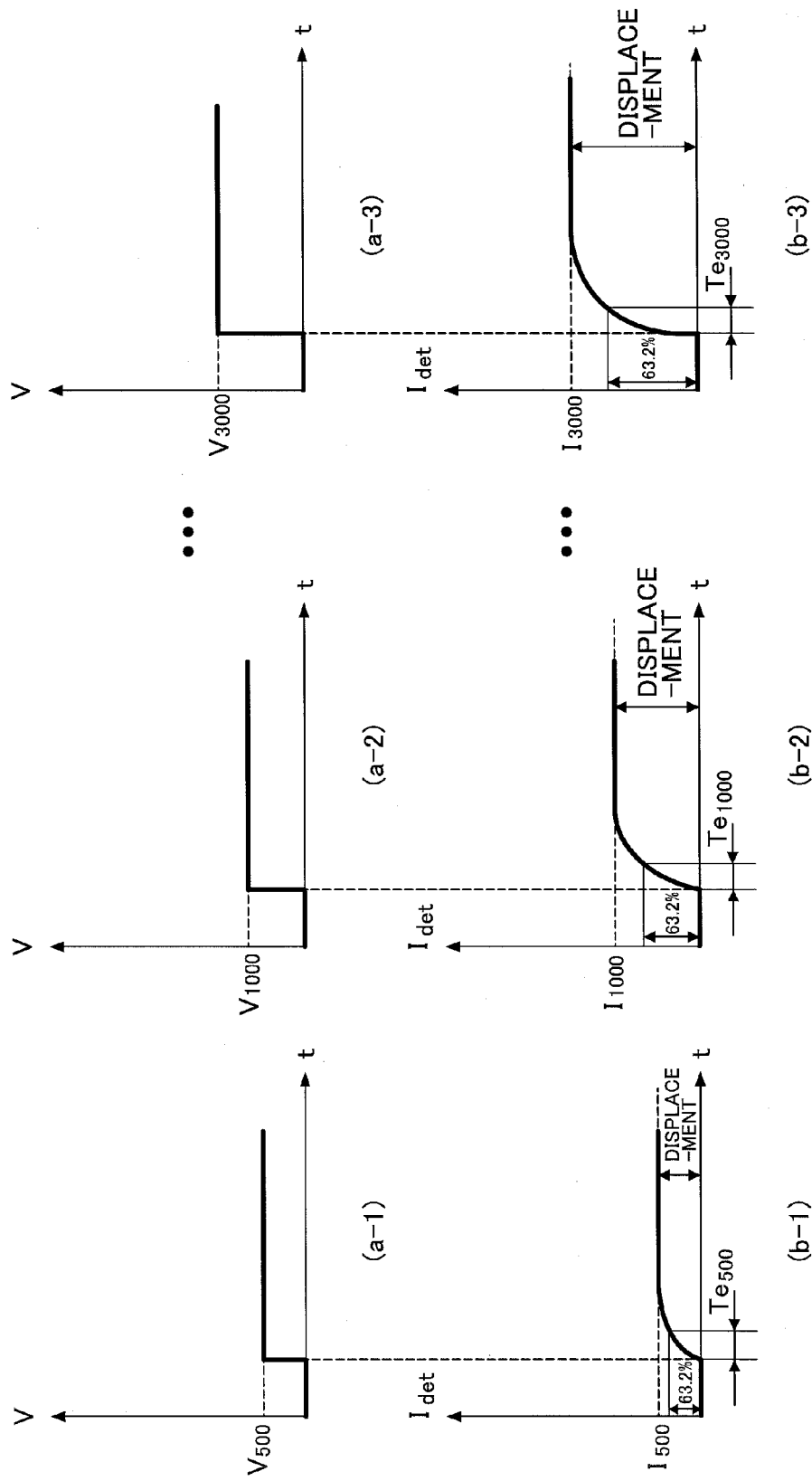
FIG. 6 illustrates a method of measuring an electrical time constant of an electric motor.

On the other hand, FIG. 6 illustrates how to experimentally acquire the relationships between the electrical time constant Te and the rotational speed $\omega_{det}$ of the electric motor 130. In FIG. 6, a graph (a-1) illustrates a step input of a voltage $V_{500}$ such that the rotational speed becomes 500 rpm. A graph (b-1) illustrates a temporal change of the actually measured value $I_{det}$ of the current flowing through the coil of the electric motor 130 when the step input of the voltage $V_{500}$ is given to the electric motor 130.

As can be seen from the graph (b-1), it is possible to derive the electrical time constant $Te_{500}$ at a time of 500 rpm in the rotational speed by acquiring a time required for the actually measured value $I_{det}$ of the current to reach 63.2% of the displacement.

Similarly, a graph (a-2) illustrates a step input of a voltage $V_{1000}$ such that the rotational speed becomes 1000 rpm. A graph (b-2) illustrates a temporal change of the actually measured value $I_{det}$ of the current flowing through the coil of the electric motor 130 when the step input of the voltage $V_{1000}$ is given to the electric motor 130.

As can be seen from the graph (b-2), it is possible to derive the electrical time constant $Te_{1000}$ at a time of 1000 rpm in the rotational speed by acquiring a time required for the actually measured value $I_{det}$ of the current to reach 63.2% of the displacement.

Similarly, a graph (a-3) illustrates a step input of a voltage $V_{3000}$ such that the rotational speed becomes 3000 rpm. A graph (b-3) illustrates a temporal change of the actually measured value $I_{det}$ of the current flowing through the coil of the electric motor 130 when the step input of the voltage $V_{3000}$ is given to the electric motor 130.

As can be seen from the graph (b-3), it is possible to derive the electrical time constant $Te_{3000}$ at a time of 3000 rpm in the rotational speed by acquiring a time required for the actually measured value $I_{det}$ of the current to reach 63.2% of the displacement.

The graph of Te in FIG. 7 is the thus acquired electrical time constants at respective rotational speeds. In FIG. 7, the abscissa axis denotes the rotational speed of the electric motor 130 and the ordinate axis denotes the values acquired from standardizing the respective values of the electrical time constant.

Thus, the mechanical time constant Tm and the electrical time constant Te of the electric motor 130 vary depending on the rotational speed. Therefore, in the load torque estimation apparatus 100, when the motor nominal model P(s) is used to calculate an estimated value $\omega_e$ of the rotational speed, the mechanical time constant Tm and the electrical time constant Te are successively updated according to the actually measured value ($\omega_{det}$) of the rotational speed of the electric motor 130 acquired at the time of calculation.

Specifically, based on the graph of FIG. 7, Tm and Te are approximated in forms of Nth-order formulas as functions of the rotational speed, respectively. Then, the mechanical time constant Tm and the electrical time constant Te are calculated by substituting the actually measured value of the rotational speed of the electric motor 130 acquired at the time of calculation in these approximation formulas. Then, the thus calculated mechanical time constant Tm and the electrical time constant Te are used to generate (or update) the motor nominal model P(s) and the generated (or updated) motor nominal model P(s) is used to calculate the estimated value $\omega_e$ of the rotational speed.

Note that the mechanical time constant Tm and the electrical time constant Te can be expressed by the following formulas when being expressed by primary expressions, for example.

$Tm = Am \times \omega_{det} + Bm$ (where Am and Bm are constants, respectively)

$Te = Ae \times \omega_{det} + Be$ (where Ae and Be are constants, respectively)

Note that the approximation formulas are not limited to such primary expressions.

Note that the method of deriving the mechanical time constant Tm and the electrical time constant Te is not limited to such a method of using approximation formulas as those mentioned above. For example, it is also possible to employ a method of deriving, at a time of calculation, the mechanical time constant Tm and the electrical time constant Te corresponding to the rotational speed closest to the actually measured value ($\omega_{det}$) of the rotational speed of the electric motor 130 according to a table which is previously prepared according to the graph of FIG. 7.

Note that in the above description, the above-mentioned approximation formulas or table are/is prepared based on FIG. 7 illustrating the mechanical time constants and the electrical time constants for the range from 0 rpm to 3000 rpm in the rotational speed. However, embodiments of the present invention are not limited thereto. For example, it is also possible to prepare such approximation formulas or a table using a result acquired from an experiment carried out for a broader range of the rotational speed.

<Process According to Load Torque Estimation Program>

Figure 8:
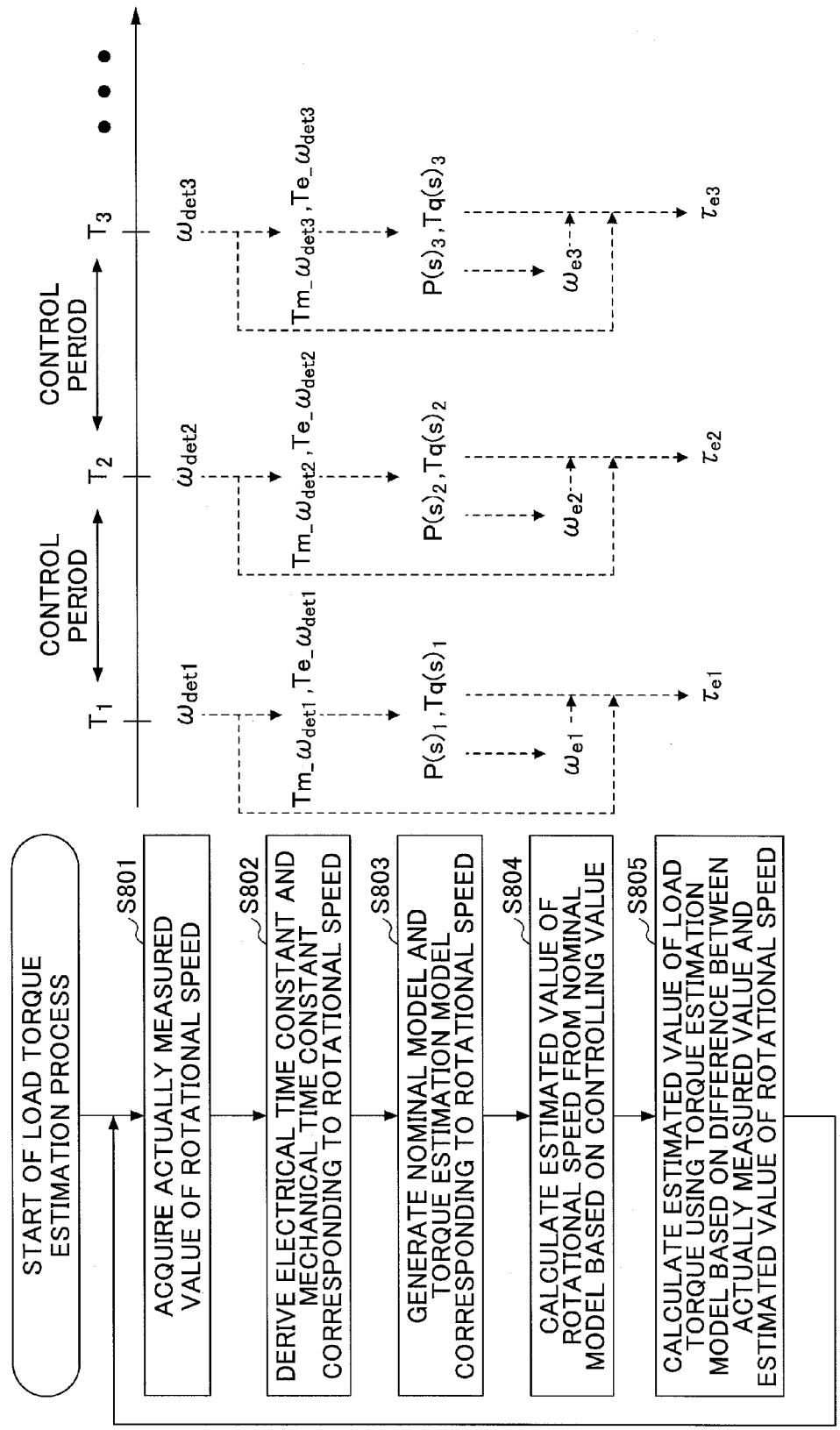
FIG. 8 is a flowchart illustrating a flow of a load torque estimation process.

Next, a flow of a load torque estimation process according to the load torque estimation program 110 of calculating an estimated value of load torque while updating the mechanical time constant and the electrical time constant of an electric motor according to its rotational speed will be described. FIG. 8 is a flowchart illustrating a flow of a load torque estimation process according to the load torque estimation program 110.

When the load torque estimation program 110 is executed, the actually measured value input part 204 acquires the actually measured value $\omega_{det1}$ of the rotational speed at a timing T1 in Step S801.

In Step S802, the derivation part 207 derives the mechanical time constant and the electrical time constant corresponding to the actually measured value $\omega_{det1}$ of the rotational speed based on the approximation formulas. Here, the mechanical time constant Tm_$\omega_{det1}$ and the electrical time constant Te_$\omega_{det1}$ are derived.

In Step S803, the rotational speed estimation part 210 generates the motor nominal model P(s)$_1$ based on the mechanical time constant Tm_$\omega_{det1}$ and the electrical time constant Te_$\omega_{det1}$. Further, the torque estimation part 211 generates the torque estimation model Tq(s)$_1$.

In Step S804, the estimation part 206 acquires the controlling value (voltage value V$_{ctl1}$) that is output by the control part 200 at the timing T1. Further, the rotational speed estimation part 210 calculates the estimated value $\omega_{e1}$ of the rotational speed by multiplying the motor nominal model P(s)$_1$ generated in Step S803 by the controlling value (voltage value V$_{ctl1}$).

In Step S805, the estimation part 206 calculates the difference value between the actually measured value $\omega_{det1}$ of the rotational speed acquired in Step S801 and the estimated value $\omega_{e1}$ of the rotational speed calculated in Step S804.

Further, the torque estimation part 211 calculates the estimated value $\tau_{e1}$ of the load torque by multiplying the torque estimation model Tq(s)$_1$ generated in Step S803 by the thus calculated difference value.

When calculation of the estimated value $\tau_{e1}$ of the load torque is finished in Step S805, waiting is carried out for the next control period. In the next control period, again the process starting from Step S801 is executed.

That is, at a timing T2, the actually measured value $\omega_{det2}$ of the rotational speed is acquired (Step S801) and the mechanical time constant Tm_$\omega_{det2}$ and the electrical time constant Te_$\omega_{det2}$ are derived (Step S802). Further, the motor nominal model P(s)$_2$ and the torque estimation model Tq(s)$_2$ are generated (Step S803), the estimated value $\omega_{e2}$ of the rotational speed is calculated (Step S804) and the estimated value $\tau_{e2}$ of the load torque is calculated (Step S805).

Thereafter, also in the further next control period, the same process is repeated. Thus, for every control period, the mechanical time constant and the electrical time constant are calculated according to the actually measured value of the rotational speed, and the estimated value of the load torque is calculated. As a result, it is possible to reduce the errors in the estimated values of the load torque regardless of the rotational speeds.

Summary of Embodiment

As can be seen from the above description, in the load torque estimation apparatus according to the present embodiment, a model of an electric motor that is a control target is determined. Then, using a controlling value (voltage value) for controlling the electric motor and the actually measured value of the rotational speed of the electric motor, the load torque of the electric motor is estimated.

When determining the model of the electric motor, attention is focused on the fact that the mechanical time constant and the electrical time constant vary depending on the rotational speed of the electric motor, and the mechanical time constant and the electrical time constant are derived based on the actually measured value of the rotational speed.

The mechanical time constant and the electrical time constant at each rotational speed are acquired by an experiment and are approximated by Nth-order approximation formulas or are stored in a form of a table previously.

The mechanical time constant and the electrical time constant are derived every control period based on the approximation formulas or the table, and the mechanical time constant and the electrical time constant included in the model are updated every control period.

For every control period, an estimated value of the load torque is calculated using the model thus updated.

Thereby, it is possible to avoid an increase in an error of an estimated value of load torque due to a rotational speed of an electric motor. As a result, it is possible to improve accuracy in an estimation of load torque of an electric motor.

Second Embodiment

In the first embodiment, the mechanical time constant and the electrical time constant are derived every control period. However, the present invention is not limited thereto. As shown in FIG. 7, when the changes in the mechanical time constant and the changes in the electrical time constant along with the changes in the rotational speed are compared, it is seen that the changes in the mechanical time constant along with the changes in the rotational speed are greater than the changes in the electrical time constant along with the changes in the rotational speed.

Therefore, it is possible that only the mechanical time constant is derived every control period and a predetermined value is previously substituted for the electrical time constant.

Third Embodiment

In the first embodiment, the actually measured value of the rotational speed is fed back and thus the control part 200 carries out feedback control such that the electric motor 130 is rotated at the target rotational speed. Alternatively, the actually measured value of the position information is fed back and thus the control part 200 carries out feedback control such that the electric motor 130 is rotated to the target position.

However, in the present invention, control carried out by the control part 200 is not limited thereto. For example, it is also possible to carry out speed feedforward control for a target rotational speed or position feedforward control for a target position.

Fourth Embodiment

In the above-mentioned first to third embodiments, a target apparatus/machine or so to which the load torque estimation apparatus 100 is applied is not explicitly mentioned. The load torque estimation apparatus 100 according to any one of the above-mentioned first to third embodiments can be applied to, for example, an image forming apparatus in which a drive motor driving and rotating a drive roller is provided. It is also possible to apply the load torque estimation apparatus 100 according to any one of the above-mentioned first to third embodiments to an automobile, a robot, an amusement machine or so.

Figure 9:
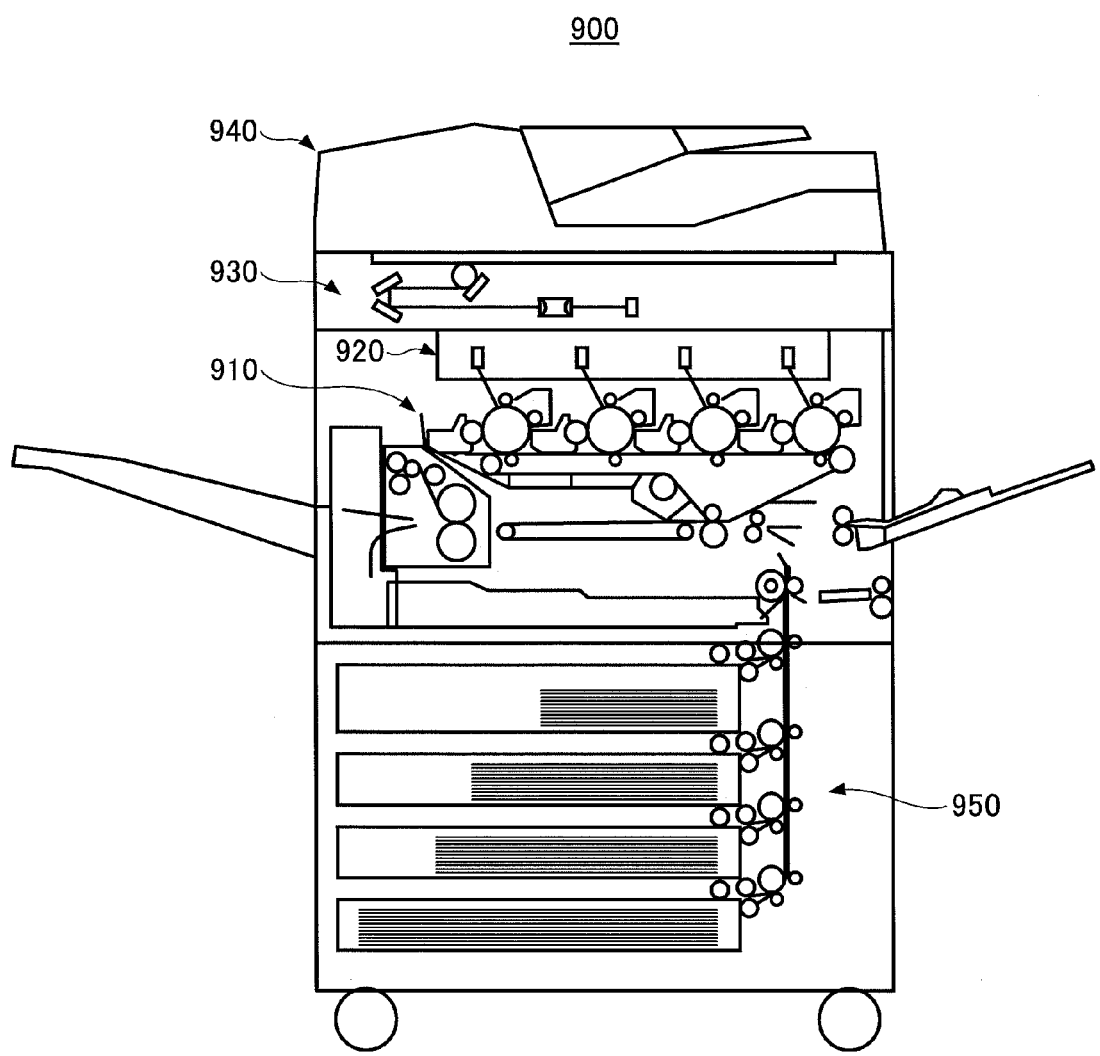
FIG. 9 illustrates an internal configuration of an image forming apparatus.

FIG. 9 illustrates the internal configuration of an image forming apparatus 900 which is one example of an apparatus, a machine or so to which the load torque estimation apparatus 100 is applied. As shown in FIG. 9, the image forming apparatus 900 includes an intermediate transfer unit 910, an optical writing unit 920, a scanner 930, an automatic document feeder 940 and a paper feeding device 950.

Figure 10:
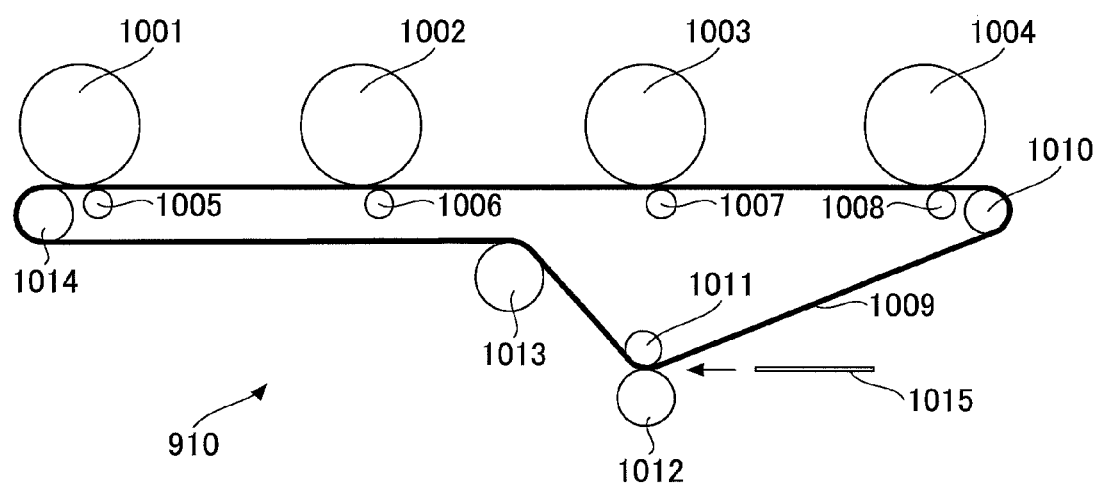
FIG. 10 illustrates a driving and conveyance mechanism in an intermediate transfer unit of an image forming apparatus in a magnified manner.

FIG. 10 illustrates a driving and conveyance mechanism in the intermediate transfer unit 910 of the image forming apparatus 900 in a magnifying manner. As shown in FIG. 10, the driving and conveyance mechanism of the intermediate transfer unit 910 has an intermediate transfer belt 1009 as an intermediate transfer member, photosensitive drums 1001-1004 as image carrying members, primary transfer rollers 1005-1008 as primary transfer members and a drive roller 1010. The driving and conveyance mechanism of the intermediate transfer unit 910 further has a secondary transfer facing roller 1011, a secondary transfer roller 1012, a tension roller 1013, a driven roller 1014 and so forth. Note that the drive roller 1010 is driven and rotated by a drive motor which is a driving part.

As a defective image caused by the driving and conveyance mechanism of the intermediate transfer unit 910 in the image forming apparatus 900, there may be an image having a banding phenomenon of periodically or randomly generating band-like density variations. In particular, a phenomenon called shock jitter is known of generating a band-like density variation in a specific timing due to a shock occurring when the front or rear edge of a recording medium 1015 passes through the driving and conveyance mechanism, two types of driving and conveyance mechanisms come into contact with one another or are removed from one another, or so.

As a countermeasure for such a banding phenomenon caused by shock jitter, a method is known of reducing a variation in the rotational speed of the drive roller 1010 occurring due to a load variation when the front or rear edge of a recording medium 1015 passes through the secondary transfer area. According to this method, control is carried out such that even if a load varies, the drive roller 1010 is rotated at a fixed rotational speed.

By applying the load torque estimation apparatus 100 according to any one of the above-mentioned embodiments to a process of controlling the drive motor driving and rotating the drive roller 1010 and changing the motor nominal model, it is possible to carry out a control voltage/load torque estimation with high precision in response to a load torque variation. Then, by feeding back the estimated control voltage, it is possible to reduce an influence of a load torque variation due to shock jitter.

According to the embodiments of the present invention, it is possible to improve accuracy in an estimation of load torque of an electric motor.

Note that the present invention is not limited to the configurations shown above. It is possible to combine any other element(s) to any configuration described above concerning the above-mentioned embodiments, for example. In this regard, it is possible to make any change without departing from the scope of the present invention and it is possible to determine the change appropriately depending on a particular applied form.

Thus, the load torque estimation apparatuses, the image forming apparatuses, the load torque estimation methods and the non-transitory computer-readable information recording mediums have been described by the embodiments. However, the present invention is not limited to the specifically disclosed embodiments, and any other variations and modifications may be made without departing from the scope of the present invention.

The present application is based on and claims the benefit of priority of Japanese Priority Application No. 2013-191150 filed Sep. 13, 2013 and Japanese Priority Application No. 2014-153607 filed Jul. 29, 2014, the entire contents of which are hereby incorporated herein by reference.

What is claimed is:

1. A load torque estimation apparatus configured to estimate load torque of an electric motor, the load torque estimation apparatus comprising:
 a processor and a memory, the memory containing instructions that, when executed by the processor, configures the processor to,
  input, to a model, a controlling value for controlling the electric motor and a rotational speed of the electric motor, and
  estimate load torque of the electric motor by,
   deriving an electrical time constant of the electric motor corresponding to the rotational speed of the electric motor at a first control period,
   updating the electrical time constant included in the model based on the electrical time constant corresponding to the rotational speed of the electric motor at the first control period, and
   estimating the load torque of the electric motor at a second control period subsequent to the first control period based on the updated model.

2. The load torque estimation apparatus as claimed in claim 1, wherein the processor is further configured to,
 derive a mechanical time constant of the electric motor corresponding to the rotational speed of the electric motor at the first control period,
 update the mechanical time constant included in the model based on the electrical time constant corresponding to the rotational speed of the electric motor at the first control period and
 estimate the load torque of the electric motor at the second control period based on the updated model.

3. The load torque estimation apparatus as claimed in claim 2, wherein the processor is configured to,
 derive the electrical time constant of the electric motor corresponding to the rotational speed of the electric motor at the first control period using an approximation formula or a table prescribing relationships between the rotational speed of the electric motor and the electrical time constant of the electric motor, and
 derive the mechanical time constant of the electric motor corresponding to the the rotational speed of the electric motor at the first control period using an approximation formula or a table prescribing relationships between the rotational speed of the electric motor and the mechanical time constant of the electric motor.

4. The load torque estimation apparatus as claimed in claim 1, wherein the processor is configured to acquire the rotational speed of the electric motor based on an output of a two-phase encoder or an output of a magnetic sensor provided to the electric motor.

5. An image forming apparatus comprising:
the load torque estimation apparatus claimed in claim 1.

6. The load torque estimation apparatus of claim 1, wherein the electrical time constant is based on one or more of an inductance of a coil of the electric motor and a resistance of the coil of the electric motor.

7. The load torque estimation apparatus as claimed in claim 1, wherein the rotational speed of the electric motor input to the load torque estimation apparatus is determined by measuring an actual rotational speed of the electric motor.

8. A method of estimating load torque of an electric motor in a load torque estimation apparatus configured to estimate load torque of an electric motor, the method comprising:
inputting a controlling value for controlling the electric motor and a rotational speed of the electric motor to a model; and
estimating load torque of the electric motor based on the model by,
deriving an electrical time constant of the electric motor corresponding to the rotational speed of the electric motor at a first control period,
updating the electrical time constant included in the model based on the electrical time constant corresponding to the rotational speed of the electric motor at the first control period, and
estimating the load torque of the electric motor a second control period subsequent to the first control period based on the updated model.

9. The method claim 8, wherein the electrical time constant is based on one or more of an inductance of a coil of the electric motor and a resistance of the coil of the electric motor.

10. The method as claimed in claim 8, wherein the rotational speed of the electric motor input to the load torque estimation apparatus is determined by measuring an actual rotational speed of the electric motor.

11. A load torque estimation apparatus configured to estimate load torque of an electric motor, the load torque estimation apparatus comprising:

a processor and a memory, the memory containing instructions that, when executed by the processor, configures the processor to, input, to a model, a controlling value for controlling the electric motor and a rotational speed of the electric motor, and estimate load torque of the electric motor based on the model, derive an electrical time constant of the electric motor corresponding to the rotational speed of the electric motor at a first control period, update the electrical time constant included in the model based on the rotational speed of the electric motor at a second control period subsequent to the first control period, and re-estimate the load torque based on the updated model.

12. The load torque estimation apparatus of claim 11, wherein the processor is configured to update a mechanical time constant included in the model based on the rotational speed of the electric motor.

13. The load torque estimation apparatus of claim 11, wherein the processor is configured to update the electrical time constant based on an approximation formulate or table prescribing relationships between the rotational speed of the electric motor and the electrical time constant of the electric motor.

14. The load torque estimation apparatus of claim 11, wherein the processor is configured to acquire the rotational speed of the electric motor based on an output of a two-phase encoder or an output of a magnetic sensor provided to the electric motor.

15. An image forming apparatus comprising:
the load torque estimation apparatus claimed in claim 11.

16. The load torque estimation apparatus of claim 11, wherein the electrical time constant is based on one or more of an inductance of a coil of the electric motor and a resistance of the coil of the electric motor.

17. The load torque estimation apparatus as claimed in claim 11, wherein the rotational speed of the electric motor input to the load torque estimation apparatus is determined by measuring an actual rotational speed of the electric motor.

* * * * *